Figure 1:
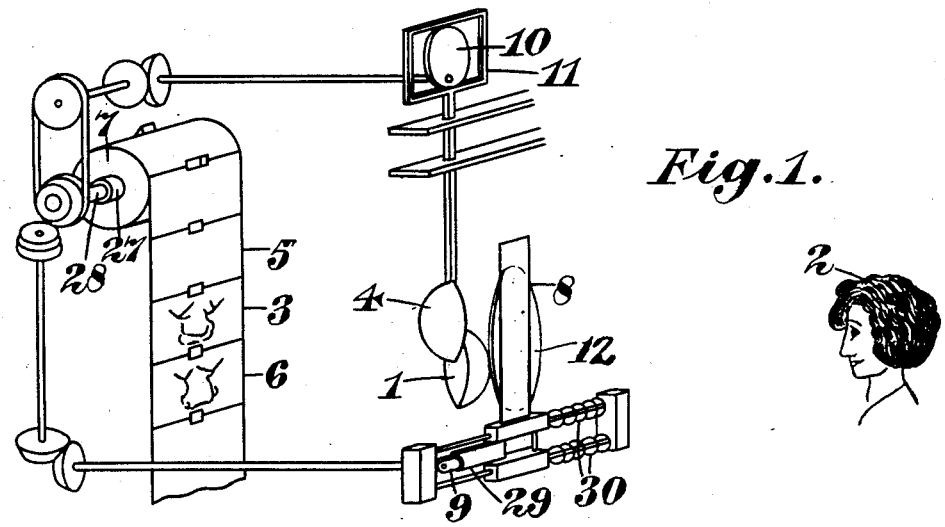

Feb. 25, 1936.  J. L. BAIRD  2,032,164

CINEMATOGRAPHIC RECTIFYING SYSTEM

Filed Jan. 23, 1935

Inventor
J. L. Baird,
By Watson, Coit,
Marve & Grindle
Att'ys

Patented Feb. 25, 1936

2,032,164

UNITED STATES PATENT OFFICE 2,032,164

CINEMATOGRAPHIC RECTIFYING SYSTEM

John Logie Baird, London, England

Application January 23, 1935, Serial No. 3,146
In Great Britain January 22, 1934

4 Claims. (Cl. 88—16.8)

This invention is for improvements in or relating to cinematographic systems and apparatus, and in particular it relates to systems of the type in which the cinematograph record carrier (i. e. the film) is continuously exposed.

Now it has hitherto been suggested in apparatus of the type to which the invention relates to use lenses or other image-casting devices which move in cooperation with the film-motion to produce stationary images thereupon, or upon a screen by projection therefrom. The present invention has for an object the provision of an improved system and apparatus of this kind, in which certain mechanical difficulties heretofore encountered are wholly or in part avoided.

To this end, the present invention broadly envisages the provision of a lens or lens-system which moves in cooperation with the image-carrying band or film upon which it focuses an image or from which it projects an image upon a screen, characterized in that instead of the lens-succession or lens-cascade hitherto employed two lenses or one split lens are used and given a ricip-rotary motion in a direction corresponding with that of motion of the film.

The present invention, in one mode, is carried into effect by means of a half lens which moves downwards or upwards with the film to an extent corresponding with the height of three picture-frames, and then returns to its original position, during its return journey it is covered by a shutter and the fixed lens is covered during the movement of the film, the series of motions being cyclically repetitive. The other half of the lens is stationary and casts an image from the stationary film while the first half attached to the claw mechanism makes its return.

A shutter is used to obscure each half of the lens in turn during its functionally inoperative period.

The motion of the lenses relative to the film may be adjusted so as to make the images coincide and remain stationary.

The lenses may be focused at infinity and a large lens placed in front of them to focus the images upon the screen and to make them coincide the focal length of the large lens being equal to its distance from the screen.

The film in the above described cases is given an intermittent motion and while the film is at rest the shutter changes over from one half lens or lens to the other the shutter being so arranged that the light cut off from one half lens or lens equals at each instant the light admitted from the other so that there is no flicker.

It will be clear to those skilled in the art that systems and apparatus according to the invention are applicable, with appropriate adaptation, both to cinematographic photography and to cinematographic projection; moreover, the invention in particulars hereinafter to be related, is especially suitable for use with television apparatus where a film is to be scanned to derive, or to the imbued with photographic images corresponding with, a television signal. For example, the invention is particularly suited to television systems of the so called "film-intermediate" type, especially when so called vertical scanning, or when so called intercalated scanning, is employed.

In order that I may more particularly describe and ascertain the nature and manner of functioning of apparatus according to the invention, reference is directed to the accompanying diagrammatic drawing in which:—

Figure 2:
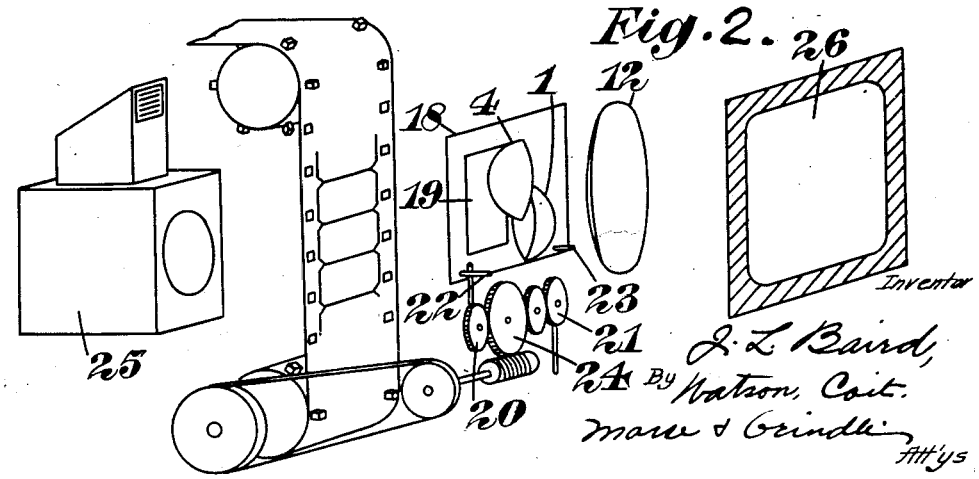

Figure 1 illustrates a mode of carrying out the invention applied to cinematographic camera using centre-slotted film, Figure 2 illustrates a cinematographic projector incorporating an embodiment of the invention.

Referring to Figure 1 a fixed lens-segment 1 focuses an image of an object 2 on to a film-frame 3, while it is stationary in the gate; while the film is moving, however, a separate but juxtaposed lens-segment 4, which moves downwards at substantially the same rate as the film itself, projects an image on to the film-frame 5 during the period when this frame is moving from the position indicated at 5 to that indicated at 6: i. e. two whole picture frames. The centre-sprocket pinion 7 is mechanically operated by means not shown to move the film a distance equal to two frame heights at each motion. When the lens 4 has finished its stroke the stationary lens 1 again projects an image on to a new portion of film corresponding with the frame 3; the motion is repeated cyclically. A mask 8 operated by the cam 9 which in turn is driven from the sprocket driving mechanism, serves to occult each of the lens segments 1 and 4 alternately during its inoperative period. The lens segment 4 is reciprocated in a vertical direction by means of a cam 10, also driven by the sprocket driving mechanism and operating upon the cam frame 11. A field lens 12 of long focal length serves to render the light falling upon the segments 1 and 4 substantially parallel.

An inverse system in which the same principle is employed for projection purposes is illustrated in Figure 2; the lens reciprocating mechanism has been omitted for the sake of clarity and an alternative form of shutter comprising a diaphragm 18 having an aperture 19 is moved laterally by means of rotary strikers 20, 21 the arms of which impinge upon projections 22, 23 on the diaphragm. Suitable guides and supports, not shown, are used to carry the diaphragm 18 and the rotary strikers are driven by way of gearing 24 from the film sprocket mechanism. A projection lantern 25 and screen 26 cooperate with the apparatus in manner known per se.

I claim:—

1. In a cinematographic optical system for use with an intermittently movable photographic film, the combination with a fixed objective lens focused on and cooperating with said film while the latter is stationary, of a movable rectifying objective lens focused on the film and means for moving the rectifying objective lens with and in the direction of movement of said film for cooperation with the film during movement of the latter.

2. In a cinematographic optical system for use with an intermittently movable photographic film, the combination with a fixed objective lens focused on and cooperating with said film while the latter is stationary, of a movable rectifying objective lens focused on the film and means for moving the rectifying objective lens with and in the direction of movement of said film for cooperation with the film during movement of the latter, and means for interrupting the passage of light through one lens while the other lens is forming an image.

3. In a cinematographic optical system for use with a film movable intermittently in one direction, the combination with a fixed light refracting objective means supported in operative relation with and focused on said film for forming an image while the latter is stationary, of a movable light refracting rectifying objective means focused on the film, and mechanism for moving the rectifying means with said film to compensate for movement of the film whereby the said rectifying objective means will form an image during at least a portion of the period of movement of the film.

4. In a cinematographic optical system for use with a film movable intermittently in one direction, the combination with a fixed light refracting objective means supported in operative relation with and focused on said film for forming an image while the latter is stationary, of a movable light refracting rectifying objective means focused on the film, mechanism for moving the rectifying means with said film to compensate for movement of the film whereby the said rectifying objective means will form an image during at least a portion of the period of movement of the film, and means for obscuring each of said refracting means successively while the other is forming an image.

JOHN LOGIE BAIRD.